(12) United States Patent
Tormasov et al.

(10) Patent No.: US 7,743,275 B1
(45) Date of Patent: *Jun. 22, 2010

(54) FAULT TOLERANT DISTRIBUTED STORAGE METHOD AND CONTROLLER USING (N,K) ALGORITHMS

(75) Inventors: Alexander G. Tormasov, Moscow (RU); Vitali A. Obernikhin, Moscow (RU)

(73) Assignee: Parallels Holdings, Ltd. (BM)

( * ) Notice: Subject to any disclaimer, the term of this patent is extended or adjusted under 35 U.S.C. 154(b) by 158 days.

This patent is subject to a terminal disclaimer.

(21) Appl. No.: 12/190,000

(22) Filed: Aug. 12, 2008

Related U.S. Application Data

(63) Continuation of application No. 11/004,078, filed on Dec. 6, 2004, now Pat. No. 7,418,620, which is a continuation of application No. 09/918,875, filed on Jul. 31, 2001, now Pat. No. 6,961,868.

(60) Provisional application No. 60/269,452, filed on Feb. 16, 2001.

(51) Int. Cl.
*G06F 11/00* (2006.01)
(52) U.S. Cl. .......................................... 714/6; 714/770
(58) Field of Classification Search .................. None
See application file for complete search history.

(56) References Cited

U.S. PATENT DOCUMENTS

| | | | |
|---|---|---|---|
| 5,713,017 A | 1/1988 | Lin et al. | |
| 5,305,326 A | 4/1994 | Solomon et al. | |
| 5,537,533 A | 7/1996 | Staheli et al. | |
| 5,729,763 A | 3/1998 | Leshem | |
| 5,768,623 A | 6/1998 | Judd et al. | |
| 5,774,643 A | 6/1998 | Lubbers et al. | |
| 5,996,086 A | 11/1999 | Delaney et al. | |
| 6,067,635 A | 5/2000 | DeKoning et al. | |
| 6,157,991 A | 12/2000 | Arnon | |
| 6,163,856 A | 12/2000 | Dion et al. | |
| 6,173,293 B1 | 1/2001 | Thekkath et al. | |
| 6,173,377 B1 | 1/2001 | Yanai et al. | |

(Continued)

OTHER PUBLICATIONS

Michael O. Rabin, Efficient Dispersal of Information for Security, Load Balancing, And Fault Tolerance, Journal of the Association for Computing Machinery, vol. 36, No. 2, pp. 335-348 (1989).

(Continued)

*Primary Examiner*—Marc Duncan
(74) *Attorney, Agent, or Firm*—Bardmesser Law Group

(57) ABSTRACT

Data sets and blocks are stored in a set of independent, functionally equivalent chunks. These chunks are placed on different elements of a distributed network to achieve pre-defined level of fault tolerance. Terms of fault tolerance are defined in terms of amount of unavailable sites in the network allowing receipt and access to the data block. Maximal and minimal number of chunks available are variable method parameters. The minimal amount of data chunks K needed to restore a data block is defined. The size of each chunk is approximately 1/K of the original block size. The maximal amounts of chunks are defined during distribution operation and depend upon a requested fault tolerance level. Redundancy in data storage is minimized and varies dynamically by changing the total amount of chunks available. Significant increase in data transfer rate is possible because all block chunks could be transferred in parallel and independently.

20 Claims, 8 Drawing Sheets

U.S. PATENT DOCUMENTS

| | | | |
|---|---|---|---|
| 6,212,640 | B1 | 4/2001 | Abdelnur et al. |
| 6,279,138 | B1 | 8/2001 | Jadav et al. |
| 6,330,687 | B1 | 12/2001 | Griffith |
| 6,532,548 | B1 | 3/2003 | Hughes |
| 6,546,499 | B1 | 4/2003 | Challener et al. |
| 6,567,891 | B2 | 5/2003 | Oldfield et al. |
| 7,076,606 | B2 | 7/2006 | Orsley |
| 7,234,074 | B2 | 6/2007 | Cohn et al. |
| 7,418,620 | B1 * | 8/2008 | Tormasov et al. .............. 714/6 |
| 2002/0046405 | A1 | 4/2002 | Lahr |
| 2002/0059539 | A1 | 5/2002 | Anderson |
| 2002/0078461 | A1 | 6/2002 | Boykin |

OTHER PUBLICATIONS

Lee and Katz, "An Analytic Performance Model of Disk Arrays", 1993, ACM, pp. 98-109.

English language abstract of Tormasov, A.G. et al., "Model of Distributed Data Storing With Adjustable Redundancy," available at http://zhurnal.ape.relarn.ru/articles/2001/035.txt, p. 1 (2001).

Pfister, Gregory F. 1998. In search of clusters. Second edition. Prentice Hall, ISBN 0-13-899709-8.

Roman, Steven 1996. Introduction to Coding and Information Theory (Undergraduate Texts in Mathematics) Steven Romann, P. R. Halmos (Editor), Springer Verlag ISBN: 0387947043.

B. Marcus, P. Siegel, R. Roth. An Introduction to Coding for Constrained Systems from handbook of Coding Theory, ed. W.C. Huffman and V. Pless, Elsevier Press, 1998.

B. Marcus, P. Siegel, R. Roth. Concatenting Constrained Codes and ECC from handbook of Coding Theory, ed. W.C. Huffman and V. Pless, Elsevier Press, 1998.

Hamming, Richard W. 1986. Coding and Information Theory, 2nd Ed., Prentice-Hall Inc.

Patterson, David A., Garth A. Gibson and Randy H. Katz. A Case for Redundant Arrays of Inexpensive Disks (RAID) by David A. Patterson, Computer Science Division Department of Electrical Engineering and Computer Sciences, 571 Evans Hall University of California Berkeley, CA 94720 CSD-87-391.

Hasin M.A., TorFS—distributed file system for Internet, 1998.

* cited by examiner

FAULT TOLERANT DISTRIBUTED STORAGE METHOD AND CONTROLLER USING (N,K) ALGORITHMS

CROSS-REFERENCE TO RELATED APPLICATIONS

This application is a continuation of U.S. patent application Ser. No. 11/004,078, filed on Dec. 6, 2004, which is a continuation-in-part of U.S. patent application Ser. No. 09/918,875, filed on Jul. 31, 2001, which in turn claims priority to U.S. Provisional Patent Application No. 60/269,452, filed Feb. 16, 2001, both of which are incorporated by reference herein in their entirety.

BACKGROUND OF THE INVENTION

1. Field of the Invention

This invention relates to a method of data preparation for storing in a distributed data storage system, more particularly, the present invention relates to the method and controller for splitting of data for storage and retrieval of data with controllable redundancy for fault tolerant distributed data storage.

2. Description of the Related Art

With the growth of the use of the Internet, the need for data storage systems with the capability to manage large amounts of information has grown dramatically. Such data storage or information management systems must provide reliable service to millions of computer users.

In conventional data storage networks, large files are broken into smaller pieces and transmitted using a store-and-forward mechanism.

Anyone deploying a data storage or information management system must deal with insufficient communication channel bandwidth and the inability of computer hardware components to handle the data storage load.

One conventional approach to solving the problems of insufficient bandwidth and the inability of computer hardware to store sufficient amounts of data has been to build a distributed network data storage system. In a typical distributed network data storage system, data is stored on a network of computers that consists of a mesh of data transmission links, switching nodes, and end nodes. The data pieces are transmitted on a series of links that connect the source of the information and the actual destination nodes for the stored information. The data pieces are then reassembled at the destination node. The nodes along the path between the source of the information and its destination are primarily responsible for making sure that each data piece received is transmitted on the correct outgoing link so that the data properly reaches its destination.

To properly meet user demands for information, a distributed network data storage system must provide high-availability of stored data to the computers needing the stored data. Specifically, a distributed network data storage system should be able to stay on-line with consistent availability of uncorrupted data, even if some hardware portion of the distributed network data storage system has crashed or becomes inaccessible because of an inability to transmit data. This is shown in FIG. 1, where chunks 7 and 8 have become inaccessible due to a hardware 102 failure and a data transmission line 104 break, respectively.

To address the requirement for high-availability of stored data, one or more variations of a data mirroring technique have been used in prior art data storage systems. In the execution of a data mirroring technique, crucial data is simply duplicated in its entirety at several locations in the distributed data storage system. Special care must be taken to keep the data consistent across all locations where it is stored. However, full mirroring of all data is costly both in hardware and in physical transfer time, particularly for large systems. One solution has been to keep the stored data consistent across all nodes, especially when the stored data could be changed on-line at several nodes simultaneously. This problem of keeping stored data consistent across all nodes in a data storage network is far from trivial.

There is little doubt that providing high-availability features in a distributed data storage system requires maintaining at least some level of redundancy of stored information. Historically, the problems associated with redundant data storage were addressed by the use of Redundant Arrays of Independent Disks (RAID) technology. The main concept behind RAID data storage technology is to divide the input data into units and then write/read several units of data simultaneously to several hard disk data storage systems. Several of the most commonly used configurations, or levels, of RAID arrays are described below.

The RAID Level 0 configuration implements a striped disk array for storing data. In a RAID Level 0 configuration, the data is broken down into blocks and each block is written to a separate data storage disk. The input/output performance of each disk drive is greatly improved by spreading the input/output load across many channels and disk drives. Reconstruction of the data set is accomplished by obtaining data blocks from each separate data storage disk.

The best data storage performance is achieved when the data to be stored is striped across multiple disk drives with each single disk drive attached to a single controller. No parity calculation overhead is involved, and there are no fault tolerance capabilities in the RAID Level 0 configuration. There is no fault tolerance in the RAID Level 0 configuration because a single disk drive is connected to a single controller. Accordingly, the failure of just one disk drive will result in corruption of the stored data.

The RAID Level 1 configuration implements what is known as "disc mirroring." Disc mirroring is done to assure the reliability of stored data and a high degree of fault tolerance. A RAID Level 1 configuration also enhances data read performance, but the improved data read performance and fault tolerance come at the expense of available capacity in the disk drives used to store data. Specifically, the data to be stored is copied and then stored on multiple disk drives (or "mirrored"). The storage of data on multiple disk drives assures that, should one disk drive fail, the data is available from another disk drive on which the same data has been stored. The data read performance gain of a RAID Level 1 configuration can be realized if the redundant data is distributed evenly on all of the disk drives of a mirrored set within the subsystem. In a RAID Level 1 configuration, the number of data read requests and total wait state times both drop significantly. These drops are inversely proportional to the number of hard drives used in a RAID Level 1 configuration.

A RAID Level 5 configuration data storage algorithm represents a data storage methodology between a RAID Level 1 configuration and a RAID Level 0 configuration. The RAID Level 5 configuration is the last of the most common RAID data storage arrays in use, and is probably the most frequently implemented.

A RAID Level 5 configuration is really an adaptation of the RAID Level 0 configuration that sacrifices some data storage capacity for the same number of disk drives. However, the RAID Level 5 configuration gains a high level of data integrity or fault tolerance. The RAID Level 5 configuration takes advantage of RAID Level 0's data striping methods, except that data is striped with parity across all of the disk drives in the array. The stripes of parity information are calculated using the "Exclusive OR" function. By using the Exclusive OR function with a series of data stripes in the RAID Level 5 configuration, any lost data can easily be recovered. Should any one disk drive in the array fail, the missing information can be determined in a manner similar to solving for a single variable in an equation (for example, solving for x in the equation, 4+x=7). In an Exclusive OR operation, the equation would be similar to 1−x=1. Thanks to the use of the Exclusive OR operation, there is always only one possible solution (in this case, 0), which provides a complete error recovery algorithm in a minimum amount of storage space.

A RAID Level 5 configuration achieves very high data transfer performance by reading data from or writing data to all of the disk drives simultaneously in parallel while retaining the means to reconstruct data if a given disk drive fails, thus maintaining data integrity for the data storage system.

A RAID Level 5 configuration minimizes the data write bottlenecks by distributing parity stripes over a series of hard drives. In doing so, a RAID Level 5 configuration provides relief to the concentration of data write activity on a single disk drive, in turn enhancing overall system performance.

The disadvantages of RAID-like implementation for distributed data storage systems are clear. First, it is impossible to dynamically control redundancy (classic RAID algorithms work in the case of failure of only one disk drive; if two or more disk drives go off line simultaneously, there is no way to recover data). Second, RAID technology does not scale for more than about ten disks, mainly due to the input/output intensive fault-recovery procedures that make the RAID technology unsuitable for systems where the unavailability of one or more nodes is common.

A similar data recovery problem arises when solving the problem of reliability of information transmission via communication channels. In this case algorithms of the Hamming error correction code (ECC)/error detection code (ECD) are usually used. In general, there are two approaches to solving the problem of reliability of information transmission. Selecting a particular approach to solving this problem usually depends on requirements associated with the information transmission process. Both of the requirements associated with the information transmission process require transmitting redundant information to recover data in case of error. The first approach, called error-correction code (ECC), introduces redundancy into the stored information in the form of extra bits transmitted together with a data block so that it is possible to recover erroneous bits using received block and error-correction bits. The second approach, called error-detection code (ECD), differs from the first approach in that one can only determine whether or not the data block contains errors without knowing which bits are incorrect.

One major drawback of both the error correction code and error detection code algorithms is that they are intended for data streaming recovery. Accordingly, these two algorithms carry a significant overhead in performance and amount of redundancy data. Even in case of errorless data transfer, one has to process a significantly larger amount of data than is necessary. Also, these two algorithms rely on the low probability of a channel error. In other words, these two algorithms work correctly only if the total number of errors in the received block of data does not exceed some predetermined number.

Accordingly, there still remains a need in the art for a system which permits the storage of large amounts of data across a distributed arbitrarily-connected network of storage elements with high reliability and fault tolerance.

SUMMARY OF THE INVENTION

Accordingly, the present invention is related to a method and a controller for fault tolerant distributed storage using (N,K) algorithms that substantially obviates one or more of the disadvantages of the related art.

In one aspect of the invention, there is provided a method for data storage in a distributed data storage system with redundancy, including disassembling a data set into a plurality of data blocks; defining a number of distinct data chunks N; defining a minimal number of data chunks $K \leq N$ needed to restore one data block; transforming each of the data blocks into L data chunks, wherein $K \leq L \leq N$; and distributing the data chunks to storage elements of the distributed storage system. The storage elements may be different storage for each of data block, or for some of the data blocks. Filler can be added to any data block. Filler can be added to the data set so that the data set is an integral number of data blocks. Each data chunk can include an identifier derived from some function used for its generation. A size of each data chunk can be defined based on an integral number of Message Transfer Units. A size of each data chunk can correspond to packet size, or an integral number of packets. A number L of chunks is chosen such that $L \geq M+K$, where M is maximum number of storage elements that can fail simultaneously.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
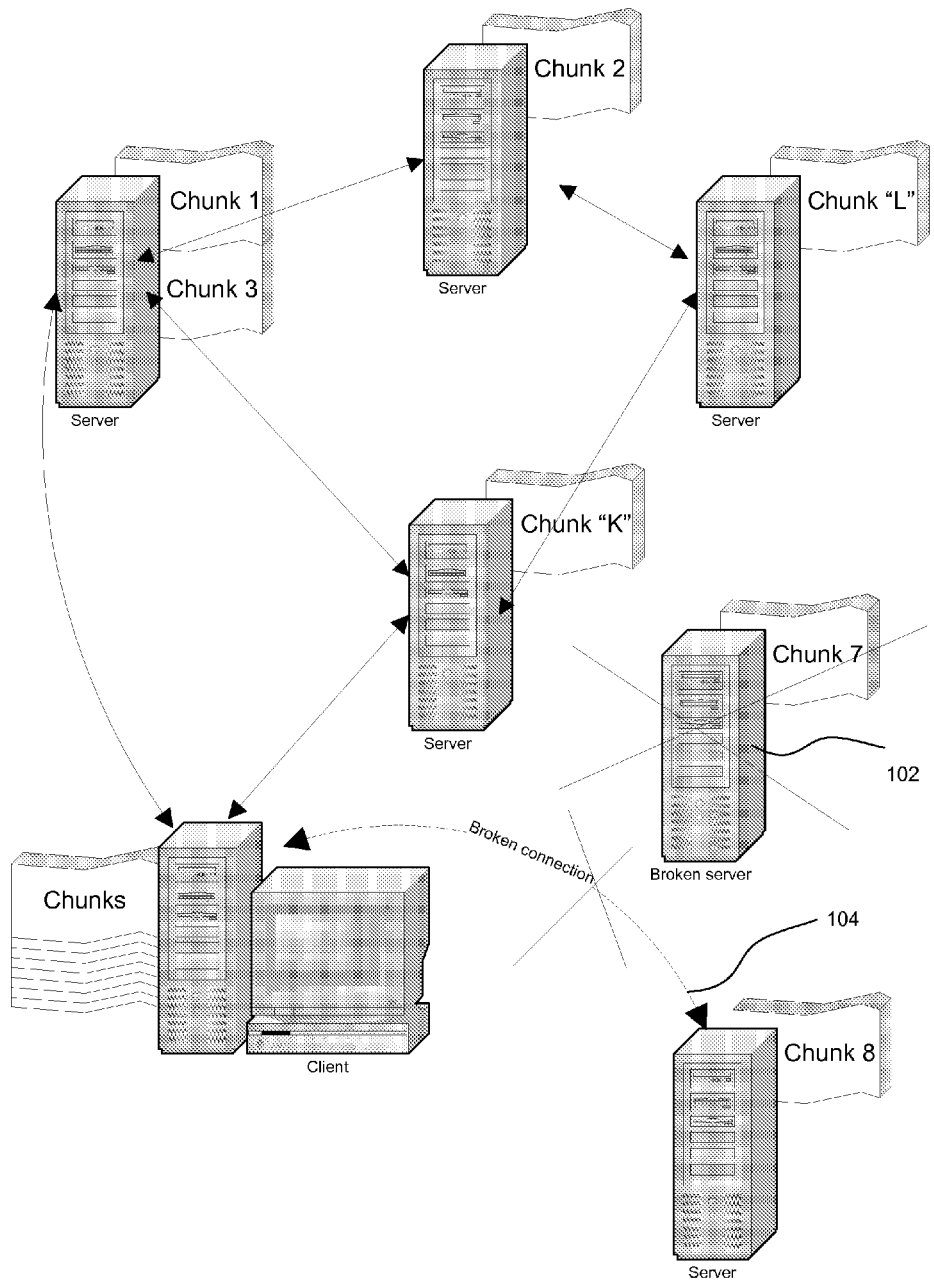
FIG. 1 is a schematic of a conventional system and method for information access on a distributed arbitrarily-connected network of servers showing the effect of a broken server or a break in a transmission line.

Reference will now be made in detail to the preferred embodiments of the present invention, examples of which are illustrated in the accompanying drawings.

The present invention defines a system, method and controller for the storage of data across a distributed arbitrarily-connected storage devices e.g. SAN disks, RAIDs, and distributed storage areas, including those that use network protocols (e.g., TCP/IP, UDP/IP using proxy, etc.) and buses (e.g., SCSI). Using the disclosed system and method, it is possible to achieve an appropriate level of data storage fault tolerance in a situation of reading or internal errors or when some storage devices or storage areas become inaccessible because of internal malfunctions or breaks in the connection between devices in the network. The present invention provides a system and method that allow the storage of data without a total mirroring of all data stored on some server in the network.

The method according to the present invention includes two primary stages: dividing large data sets into smaller data blocks, and decomposing (transforming) the blocks into chunks using an (N,K) algorithm for transmission to storage devices.

A system and method for the storage of data across a distributed arbitrarily-connected network of storage elements provides high availability and fault tolerance. Storage and retrieval of data using the invention can be implemented with controllable redundancy, which enables the optimal utilization of data storage facilities. Using the disclosed data storage system, it is possible to achieve an appropriate level of fault tolerance when either some of the servers in a network become inaccessible because of internal malfunctions or their connections to the data storage network are broken. According to the disclosed method for data storage, data file storing is allowed without total mirroring of the stored data on each server in the network.

During utilization of the proposed method, first, a preferable size of the data set is chosen, such that it can be divided into a plurality of blocks, each of which can then be transformed into N chunks. The size of the data block can be chosen based on the required minimum number K of the chunks that are needed to reassemble the original data block and then reassemble the data set, and by the maximum possible number of chunks N, such that any K of which can be used to reassemble the original block, and ultimately the original data set. Another parameter is optimum chunk size, which may be hardware optimization requirement. Note that the chunk size can also be defined by the infrastructure for data transmission, such as hard disk drive cluster size or standard packet size in a packet-based transmission network.

If the size of the data set is not equal some multiple of an integer number of data blocks, a certain amount of "filler" can be added to the data set, which may be random, pseudo-random, zero bits, etc. Note that the filler can be added both before and after the data set is broken up into the data blocks. In the case where the filler is added after the data set is broken up into the data block, all the blocks or only one data block that is less than the appropriate length can have filler added to it. Note that the filler is added primarily to ensure that each data block fulfills the requirements of the (N,K) algorithm. Where the filler is added—to data blocks, to data sets, or to some other construct, such as a file—is determined by the convenience of the implementation.

Considering the fact that in many cases data sets (for example, files, etc.) include various metadata that identifies their size, the addition of filler to such data sets or data blocks will not result in any distortion of information.

Although the term "file" is used occasionally as an example of data that can be stored, the invention is not limited to the concept of files. Other examples may include MPEG files, image files, streaming video in UDP format, or any grouping of information that conceptually corresponds to an object that can be represented in binary form.

As noted above, each complete data block is broken into numbered, interchangeable (but different) data chunks that are usually (though not necessarily) of equal size, whose number ("L") may vary over time. However, from any "K" ($K \leq N$) number out of N data chunks, it is always possible to restore the data block (and then data set) completely. This creates a condition of redundancy. The size of each data chunk is about 1/K of the size of the original block. The maximum total number "N" of data chunks can vary depending on the configuration of the storage network and on the number of storage elements contained therein. The number of data chunks may be quite large in modern computer networks and defines the selection of the storage algorithms.

When the original data set needs to be reassembled, for each of the data blocks, at least K chunks of data are identified, such that each data block can be reassembled from K chunks. The data set is then reassembled from the data blocks, in a straightforward manner.

The disclosed system and method can also be used for significant (up to "K" times) increase of the data transfer rate because of the fact that all the chunks can be transferred from "K" storage elements in parallel and independently of each other. Under some conditions, the disclosed data storage system and method provides the optimal utilization of network bandwidth and increases the rate of overall data transfer. As yet another option, all L data chunks can be requested from storage (particularly if network storage is used, where the chunks can be delivered in parallel), but only K chunks are used for reassembly of the data block. Note that any arbitrary set of K data chunks may be selected during data block reconstruction.

The process of how the disassembly and subsequent assembly works is described below. (See also discussion at http://zhurnal.ape.relarn.ru/articles/2001/035.pdf, which is incorporated herein by reference.)

For better understanding of the block disassembly and subsequent reassembly procedure, consider a Galois field $GF(N_{GF})$ for $N_{GF}=2^n(GF(2^n))$. One of the conditions of the Galois field operations is that any operations on the individual elements result in an element that is also a member of the field. The standard representation of such a Galois field $GF(2^n)$ is a polynomial of a degree no higher than n−1, whose coefficients are elements of the field $GF(2)$, which are the remainders from division by 2 (in other words, either 0 or 1). In order to form such a polynomial, it is necessary to define n coefficients (0 or 1—in other words, bit values) with $x^{n-1}$, $x^{n-2}$, . . . x, 1. In other words, each n-bit element creates such a polynomial. Addition and multiplication of such polynomials occurs based on a remainder of a division for an arbitrary indivisible polynomial of degree n over the Galois field $GF(2)$. The selection of such a polynomial $P(x)$ is based solely on convenience of implementing Euclid's algorithm for calculating the remainder. Thus, the addition of such polynomials is simply an XOR operation on the corresponding n-bit elements.

The multiplication of such elements can be divided into two stages: the first stage is a sequence of shifts and XORing (in other words, multiplication, in which the addition is replaced with an XOR operation), and the second stage is finding the remainder of the division of the polynomial that exists after the first stage, in the general case of a polynomial of degree $2^{n-2}$, by the polynomial P(x).

The second stage can also be implemented using a sequence of shifts and XOR. The division can be implemented as an operation that is the inverse of multiplication—for each value, its inverse is pre-calculated, and division by a number is replaced by multiplication by the inverse of the number.

With n=16, to implement multiplication in the Galois field, on a computer with 32-bit registers, it is possible to implement the algorithm using only shifts and XORing. It does not matter which and how many coefficients there are in the non-divisible polynomial or NULL coefficients. Therefore, selection of the non-divisible polynomial can be arbitrary. One example is $x^{16}+x^5+x^3+x+1$. This implementation, with K=5, gives relatively slow performance results, therefore, alternative implementations are possible.

In the field $GF(N_{GF})$ there is a generator P, in other words, all the elements are a degree of $P \epsilon GF(N_{GF})$. Therefore, $GF(N_{GF})=\{0, p, p^2, p^3 \ldots p^{NGF-2}, p^{NGF-1}=1\}$. In the "two-byte" case of $GF(2^{16})$, the generator is the number 3 (for the polynomial x+1). All the pairs (a, i) such that $a=p^i$ can be calculated and stored into two tables: log-sorted by a, and alog sorted by i. In other words, log $[p^i]=i$, alog $[i]=p^i$. The size of each of these tables is 128 kB. Therefore, for any element (a,b) of the field $GF(2^{16})$:

$$ab = a \log(\log [a] + \log [b]) \bmod(2^{16}-1)]$$

and $$\frac{a}{b} = a\log[(\log[a] - \log[b])\bmod(2^{16} - 1)]$$

while $$(\log [a] + \log [b]) \bmod(2^{16}-1) = \log [a] + \log [b]$$

if $$\log [a] + \log [b] < 2^{16}-1$$

and $$(\log [a] + \log [b]) \bmod(2^{16}-1) = \log [a] + \log [b] - (2^{16}-1)$$

if $$\log [a] + \log [b] > 2^{16}-1$$

and $$(\log [a] - \log [b]) \bmod(2^{16}-1) = \log [a] - \log [b]$$

if $$\log [a] - \log [b] > 0$$

and $$(\log [a] + \log [b]) \bmod(2^{16}-1) = \log [a] + \log [b] + (2^{16}-1)$$

if $$\log [a] + \log [b] < 0$$

Therefore, the operation $\bmod(2^{16}-1)$ is replaced by an operation of comparison and addition (subtraction). In other words, multiplication is reduced to addition, and division is reduced to subtraction. This implementation gives roughly an order of magnitude improvement over the randomly selected polynomial shown above.

It is apparent that the storage process of each block must be able to handle two types of requests: block disassembly and block re-assembly. As mentioned earlier, each block is stored as N chunks (N can be changed over time if needed) so that the block can be assembled from any K out of the N chunks; the size of each chunk is about 1/K of the block size.

The following is an exemplary algorithm can be used for data partitioning. Consider a finite field $P=GF(N_{GF})=GF(2^{16})$ (a Galois field of $N_{GF}=2^n=2^{16}$ elements). Finite fields exist when the number of elements is equal to a degree of a prime number (addition and multiplication operations $GF(2^n)$ fields will be described below). Each of the GF field elements can be numbered from 0 to $2^{16-1}$. Any block can be represented in the form of a sequence of 2-byte pieces. If the block consists of an odd number of bytes, a NULL-byte can be added to the end of the block. Therefore, the block can be considered as sequence of elements of a field P.

Next, consider a K-dimensional vector space Q above field P. Each element of the vector space Q is represented as K elements of P. Therefore, any file can be represented as a sequence of vectors from Q. If the number of bytes in the block is not divisible by 2K, then NULL-bytes are added until the nearest number that can be divided by 2K is reached. Let block f be sequence of vectors $q_1, q_2, \ldots q_m$ from Q. Suppose, that $E=\{e_1, e_2, \ldots e_N\}$ (a set of N vectors from Q) exists so that any K vectors from E form basis in Q. Then for every vector $e_i$ from E we can form a data chunk:

$(q_1, e_i), (q_2, e_i), \ldots (q_m, e_i)$, where $(q_j, e_i)$ is a scalar product of vectors $q_j$ and $e_i$ The scalar product of any of two vectors from Q is an element in the Galois field P. The size of such a data piece is N bytes. The size of the source block is m*2N bytes. Therefore, the size of each data chunk is mN=1/K of the entire block.

Assume that random K pieces from the set of vectors E are chosen, with the pieces denoted as $E_1, E_2, \ldots E_k$, and appropriate corresponding vectors as $\epsilon_1, \epsilon_2, \ldots \epsilon_k$. According to the condition of the set E, these vectors form a basis in Q. Thus, a matrix A having a size K×K, whose rows are vectors $\epsilon_1, \epsilon_2, \ldots \epsilon_k$, has an inverse matrix $A^{-1}$. Then $Aq_i$ is a column of the matrix A formed from $i^{th}$ elements of each of the data pieces. These columns will be referred to as $S_i$. Then, for any $I \subset [1,m]$: $q_i=A^{-1} S_i$. Therefore, the source file can be reassembled from the set of K pieces. (A piece should contain data about the vector that created the piece and original file size, to allow deletion of extra NULL-bytes.)

To solve the problem of reassembly, an algorithm is needed for construction of a set of vectors that obey to the condition that any K of the vectors can form the basis. In one embodiment of the invention, for any non-NULL element p of field P, we can create a vector $(1, p, p^2, p^K)$. Therefore, we can create $(N_{GF}-1)=(2^{16}-1)$ vectors. Any such K vectors form a basis (Vandermond's determinant), which equals to NULL if several sequence denominators coincides.

Therefore, it is easy to create the set of $N_{GF}-1=2^{16}-1$ vectors so that any K of the vectors form a basis.

In order to build a Galois field of $2^{16}$ components, in another embodiment of the invention, polynomials of degree not exceeding 15 can be considered, and components of the field of remainders from division by 2 are their coefficients (i.e., 0 or 1). To determine such a polynomial, it is necessary to assign 16 signs (0 or 1)—coefficients for $x^{15}, x^{15}, \ldots x, 1$. Therefore, such polynomial can be defined by an element having 2-byte size (which is exactly 16 bits, or two bytes).

Addition and multiplication of the polynomials calculated by modulus of indivisible polynomial $x^{16}+x^5+x^3+x+1$. (Obviously, polynomial coefficients are added and multiplied by a power of 2.)

Also, arithmetic operations in $GF(2^{16})$ can be implemented using a "pre-calculated lookup tables" algorithm, which was first proposed at the seminar Crypto'95 by R. Schroeppel, and then developed by Erik De Win and his group from Leuven University, Belgium, in 1997.

The algorithm discussed above can be realized in form of data processing procedures using software and/or hardware, for example, by the system for managing distributed storage described herein.

One example of a system for managing distributed storage, implemented in the form of a hardware controller, is described below.

During operation, the controller handles two types of requests—block assembly and block disassembly. To process these requests, the controller communicates with a server (or some other system from which it receives the data set) on an identifier level (e.g., file or block identifier), and with the distributed storage, on a data chunk identifier level.

Consider processing of block disassembling requests (requests of this type are initiated during storing). The assembly/disassembly controller gets the requests from a client or directory server. The request contains data that must be partitioned, an identifier of the data and a requested fault tolerance level for the data storage. The data set is then divided up into a number of data blocks of a predefined length. If the data set is shorter than the specified length, a filler can be added to the data set, for example, zeros, or pseudo random or random bits. This procedure is also used if the data set is not divisible into data blocks of the desired length. Each block can have an identifier added, identifying the location of block in the data set.

N, K and the algorithm itself can be defined prior to the disassembly, for example, in the controller's ROM or RAM. In the process of disassembly, the controller uses the procedure of disassembling a block on the basis of K and a value of N based, for example, on the requested fault tolerance level and the number of available (accessible) storage elements. In one embodiment of the invention, an identifier is generated for each of the L data chunks using the following algorithm: data chunk number (denominator of transforming function used for particular chunk generation, e.g., a progression used for vector construction), and optionally absolute time of creation (or version) and K are added to the identifier. The chunks can have identifiers added, identifying block to which that particular chunk belongs and also the data set to which the corresponding block belongs. Further, these chunks are handed to a storage server whose task is to transfer the chunks to the storage elements.

The controller's primary purpose is to handle the division of data sets into blocks and data blocks into chunks (it can be assumed that the actual mechanics of storage are handled elsewhere). Thus, the controller's responsibility is requesting the information from a known address, assembly of the data chunks into data blocks, assembly of the data blocks into data sets, and sending the data set to the requester (and the same process in the opposite direction).

Next, consider processing of a block assembly request. Along with the request, a system that includes the controller (which itself can be a server or a hardwired circuit) gets a block identifier and additional parameters for block search (usually, it is the absolute time of block version). Additional conditions allow specifying block version can be, for example, the latest version created after particular date, or the first version created after a specified time, etc. Optionally, a request containing time indication affects an additional mask of data chunk identifier (obviously, the primary mask is the block identifier). In this case, the system needs to receive the chunks that correspond to the identifier. For instance, under control of the operating system, the system receives the addresses where the chunks are stored, forms the READ requests for the chunks, receives the chunks and transfers them to the controller.

An alternative conceptual view of this is a "file system" where L addresses are used for L chunks, and can be accessed using a lookup table.

Every time the storage system (or server) finds qualified chunk, it returns chunk identifier to the controller, which decides if it needs the chunk. If answer is 'Yes', the chunk will be forwarded to assembly/disassembly controller.

The controller, using an algorithm as discussed above, gathers the data chunks and groups them by blocks. When the first data chunk satisfying the mask is found, server replies 'Yes'. With every consecutive chunk received, the controller looks through the chunks that are combined by versions. At all times, there is a version of the data chunk among the ones available to the controller that most closely follows the request conditions (this version is treated as the 'current' one, and all chunks should have the same version, just as all blocks should belong to the same version of decomposition of the data set into blocks). If the suggested chunk is not related to the current version, controller replies 'No'. If the version of the data chunk coincides with the current version, the controller's answer is 'Yes'. This procedure is repeated until K chunks belonging to the same version are gathered for the current block version. Once enough chunks are received, the block will be assembled and the controller will answer with a 'No' on any subsequent request.

This procedure is repeated for every block of the data set, and after getting complete set of blocks, the controller assembles the entire data set from the blocks. Filler data added during the disassemble procedure can be deleted to restore the data set.

Since each assembly request can have its own lifetime, (a) after the assembly has been finished successfully, new chunks will continue to be offered to the controller during limited time only, and (b) if the block was not assembled during the request lifetime, the controller returns a negative result (i.e., "failure to provide requested data", or similar) and it is considered by the controller that it is impossible to assemble the block (and the data set) at the moment.

In an alternative embodiment, K chunks are requested such that the sources of storage are viewed in some sense as optimal (e.g., fastest access, fastest transfer time, etc.). If, by the end of a timeout period, less than K chunks have been received, the "missing" chunks can be additionally requested from other sources of storage.

Figure 2:
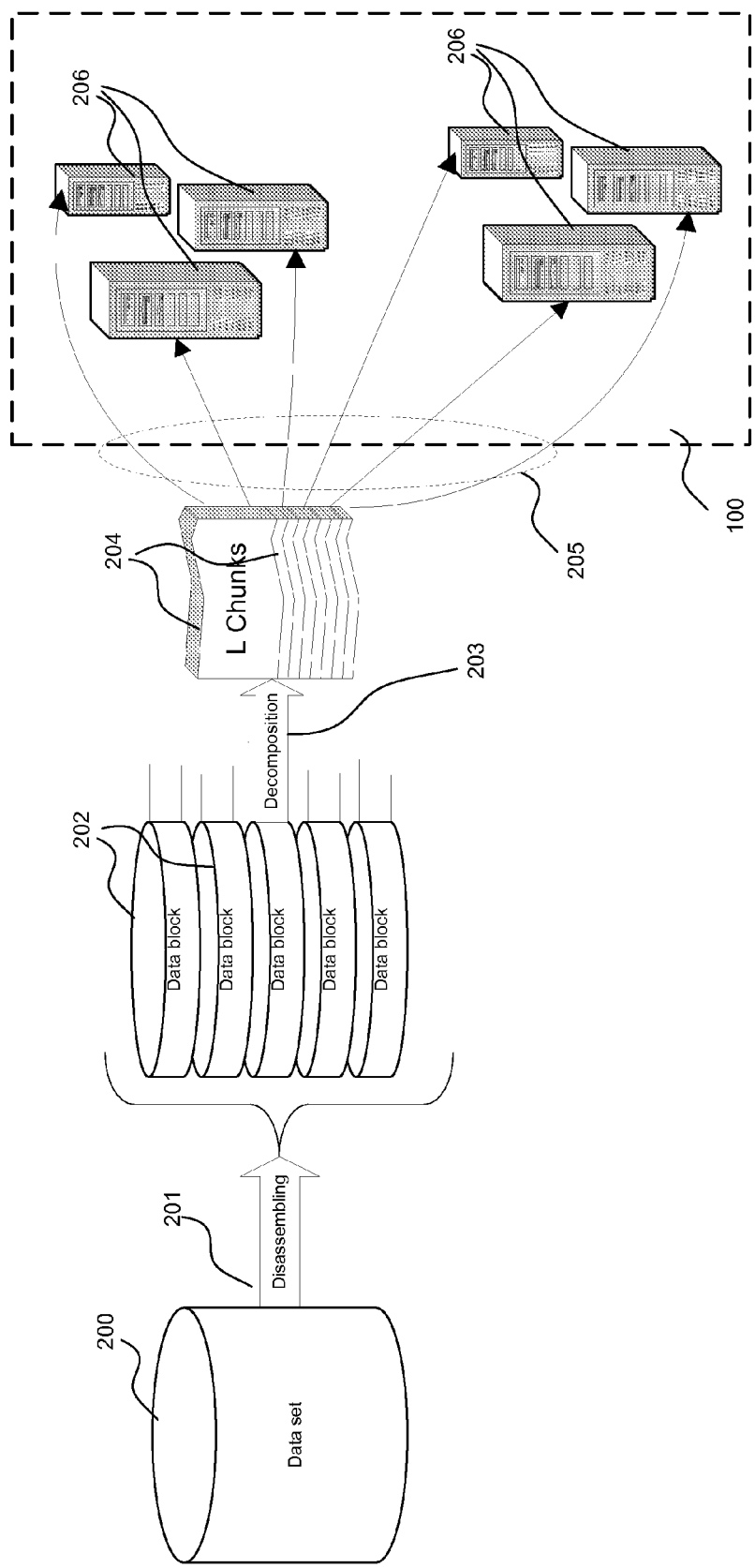
FIG. 2 is a schematic showing the system and method of one embodiment of the present invention for disassembling a file and storing data chunks on a distributed arbitrarily-connected network of servers.

FIG. 2 shows the process of storing a block in a distributed data storage system. First, the data set 200 is divided into data blocks 202 of a predetermined size (see 201). Next, each of the data blocks 202 is disassembled (see 203) into chunks 204 (e.g., into L=M+K chunks). In the second step 205, the chunks are placed on different servers 206 in the distributed arbitrarily-connected network of servers 100. Only after completion of such an operations will the step of storing the entire data set be treated as complete.

Figure 3:
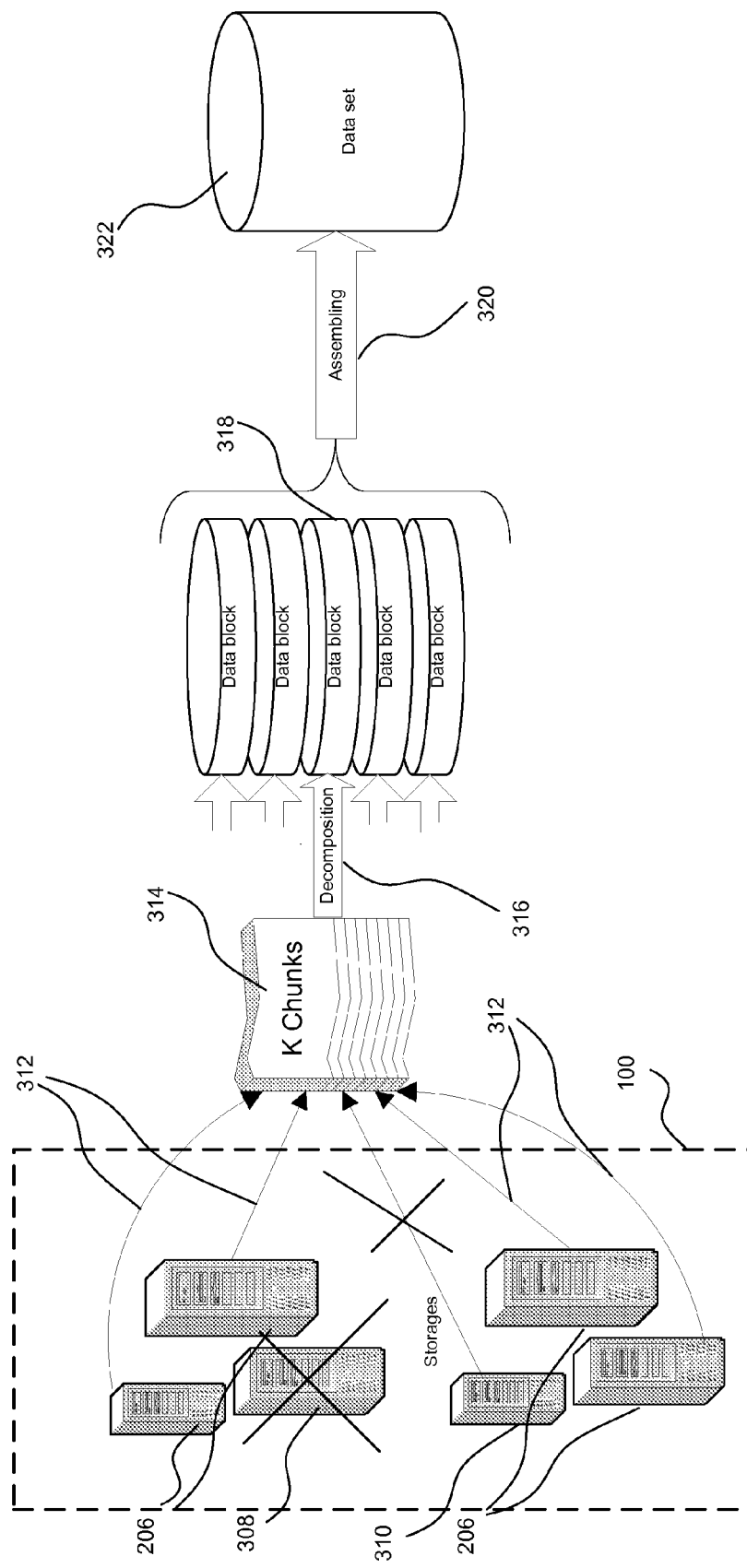
FIG. 3 is a schematic showing the system and method of the present invention for file restoration; specifically, the collection of data chunks from the distributed arbitrarily-connected network of servers and their re-assembly into the original file.

In FIG. 3 the process of retrieving the stored data from a distributed arbitrarily-connected data storage network 100 is shown. In the first stage of data retrieval, the required minimum number of data chunks "K" 314 for each block is received from the servers 206 on which the data chunks are stored. However, not all servers are needed to obtain "K" data chunks. Some of the servers could be inaccessible, e.g., server 308 could be inaccessible because of internal failure, and server 310 could be inaccessible because of data transmission line problems. Because at least "K" servers are still available within network 100, the entire data block 318 can still be reconstructed. Therefore, in the first stage of data retrieval 312, as "K" data chunks 314 would be collected, and in the second stage of data retrieval 316, the collected chunks are reconstructed into the original blocks 318. In the next step (320) all the blocks being reconstructed are assembled into the original data set 322 on the client computer.

Figure 4:
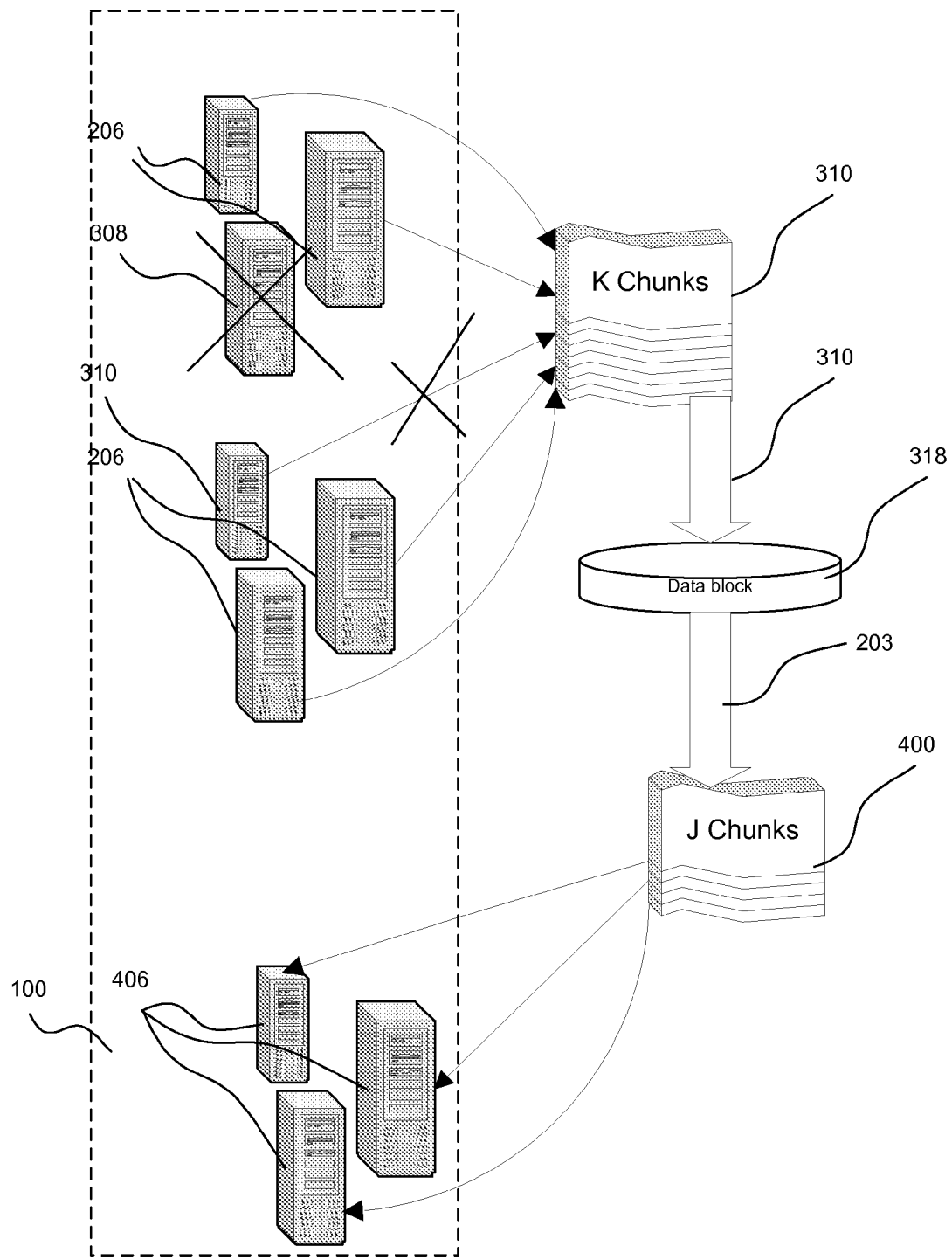
FIG. 4 is a schematic showing the system and method of the present invention for additional generation of data chunks that can be done after initial distribution of data across the distributed arbitrarily-connected network of servers.

In FIG. 4 the process of the additional generation of data chunks done after the initial distribution of data across a distributed arbitrarily-connected network 100 of servers is shown.

During normal operation of the disclosed network storage system, the requested amount of chunks "L" may vary. For example, some servers (e.g., 308 and 310) could be permanently shut down or the requested level of fault tolerance increases. In such cases, additional data chunks must be created; that is, the number "L" must increase. To create an additional set 400 of J data chunks, an original block 318 is assembled following the standard procedure 310 for composing the stored data block into chunks as shown in FIG. 3. Later, additional data chunks 400 are generated 203 and distributed across a data storage network 100 on unused servers 406. The amount of redundancy is increased by a quantum of 1/K of the original block size. It should also be noted that in the event that failed server 310 comes back online, or its communication channel is restored, the additional data chunks supplied to that server should be different not only from the data chunks that are being received, but also from chunks already supplied to other servers, since identical data chunks cannot be used for reassembly of the data blocks. Similarly, the number of generated data chunks should not exceed N for each block, since otherwise, different servers could end up with identical chunks. However, this requirement can be relaxed, since if a particular server fails entirely, the process of generating additional chunks can be used to form data chunks identical to those stored on a (irretrievably) failed server.

Figure 5:
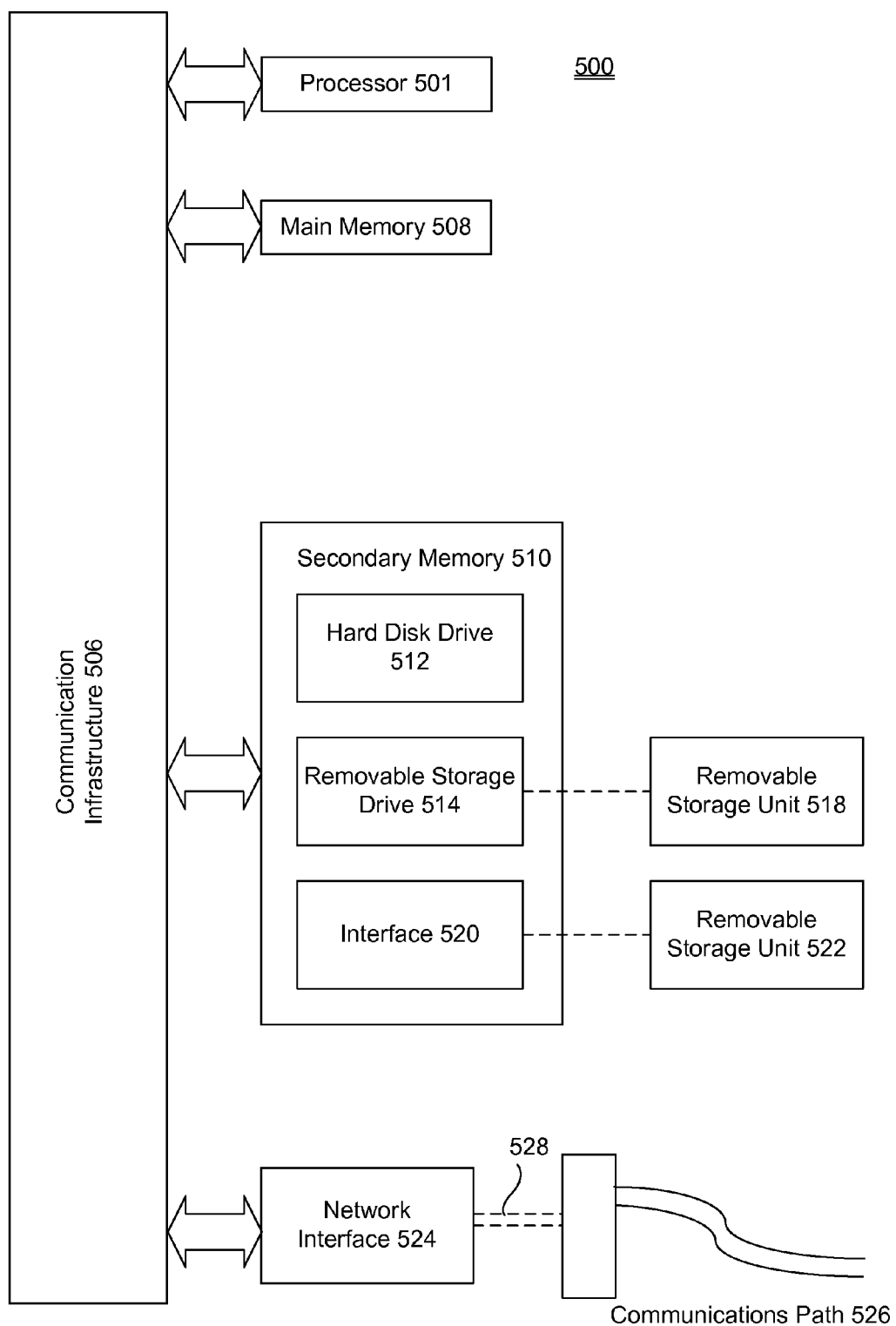
FIG. 5 is a schematic diagram of an exemplary computer or server that may be used in the invention.

An example of a computer or a physical server 500 where the present invention may be used is illustrated in FIG. 5. The physical server 500 includes one or more processors, such as processor 504. The processor 504 is connected to a communication infrastructure 506, such as a bus or network). Various software implementations are described in terms of this exemplary computer system. After reading this description, it will become apparent to a person skilled in the relevant art how to implement the invention using other computer systems and/or computer architectures.

Physical server 500 also includes a main memory 508, preferably random access memory (RAM), and may also include a secondary memory 510. The secondary memory 510 may include, for example, a hard disk drive 512 and/or a removable storage drive 514, representing a magnetic tape drive, an optical disk drive, etc. The removable storage drive 514 reads from and/or writes to a removable storage unit 518 in a well-known manner. Removable storage unit 518 represents a magnetic tape, optical disk, or other storage medium that is read by and written to by removable storage drive 514. As will be appreciated, the removable storage unit 518 can include a computer usable storage medium having stored therein computer software and/or data.

In alternative implementations, secondary memory 510 may include other means for allowing computer programs or other instructions to be loaded into physical server 500. Such means may include, for example, a removable storage unit 522 and an interface 520. An example of such means may include a removable memory chip (such as an EPROM, or PROM) and associated socket, or other removable storage units 522 and interfaces 520 which allow software and data to be transferred from the removable storage unit 522 to physical server 500.

Physical server 500 may also include one or more communications interfaces, such as communications interface 524. Communications interface 524 allows software and data to be transferred between physical server 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, an RF link and other communications channels. In an embodiment of the invention, signals 528 comprise data packets sent to processor 504. Information representing processed packets can also be sent in the form of signals 528 from processor 504 through communications path 526.

The terms "computer program medium" and "computer usable medium" are used to generally refer to media such as removable storage units 518 and 522, a hard disk installed in hard disk drive 512, and signals 528, which provide software to the physical server 500.

Computer programs are stored in main memory 508 and/or secondary memory 510. Computer programs may also be received via communications interface 524. Such computer programs, when executed, enable the physical server 500 to implement the present invention as discussed herein. In particular, the computer programs, when executed, enable the processor 504 to implement the present invention. Where the invention is implemented using software, the software may be stored in a computer program product and loaded into physical server 500 using removable storage drive 514, hard drive 512 or communications interface 524.

Figure 6:
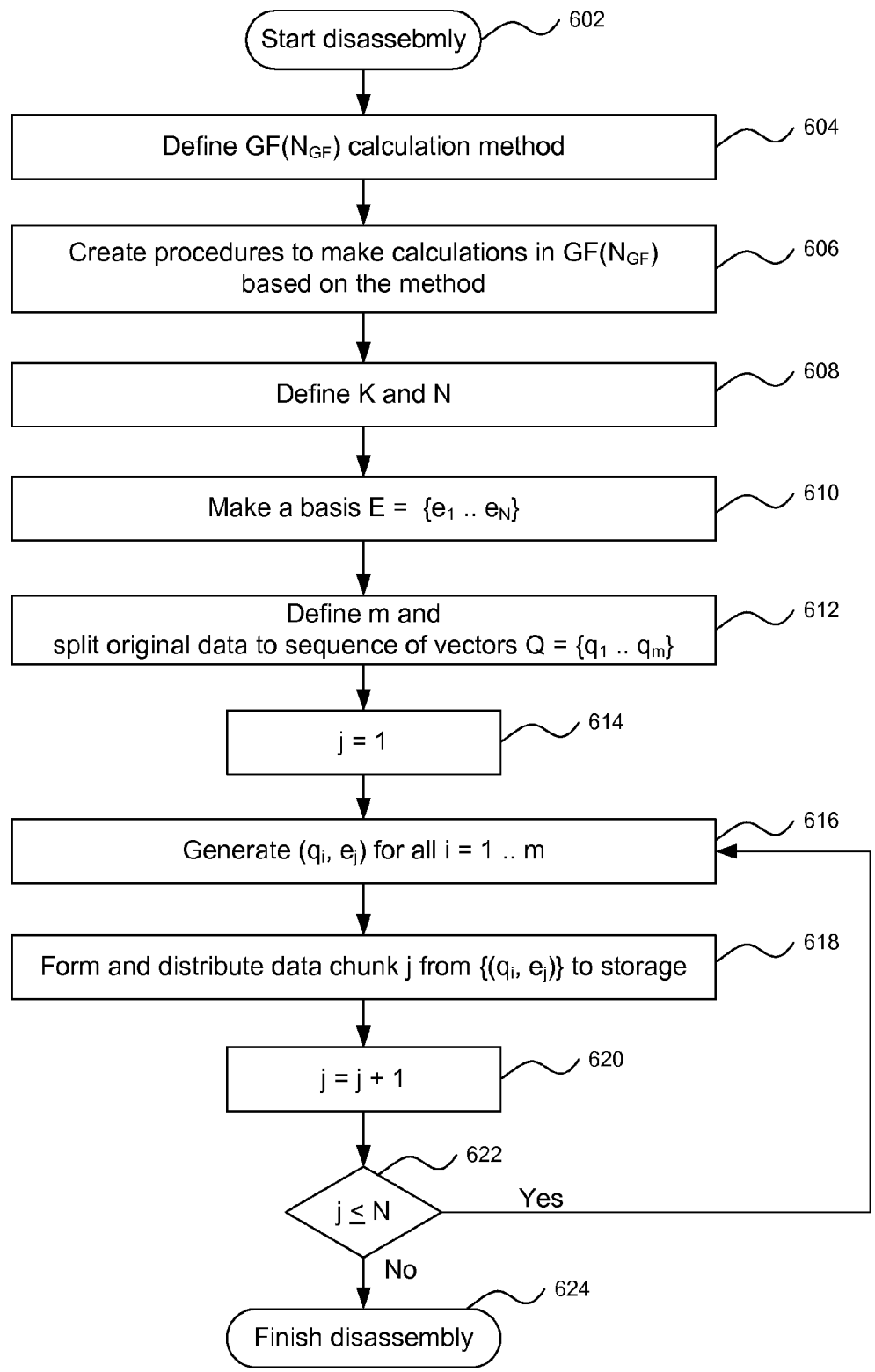
FIG. 6 illustrates the process of disassembling a data block into chunks in the alternative embodiment.
Figure 7:
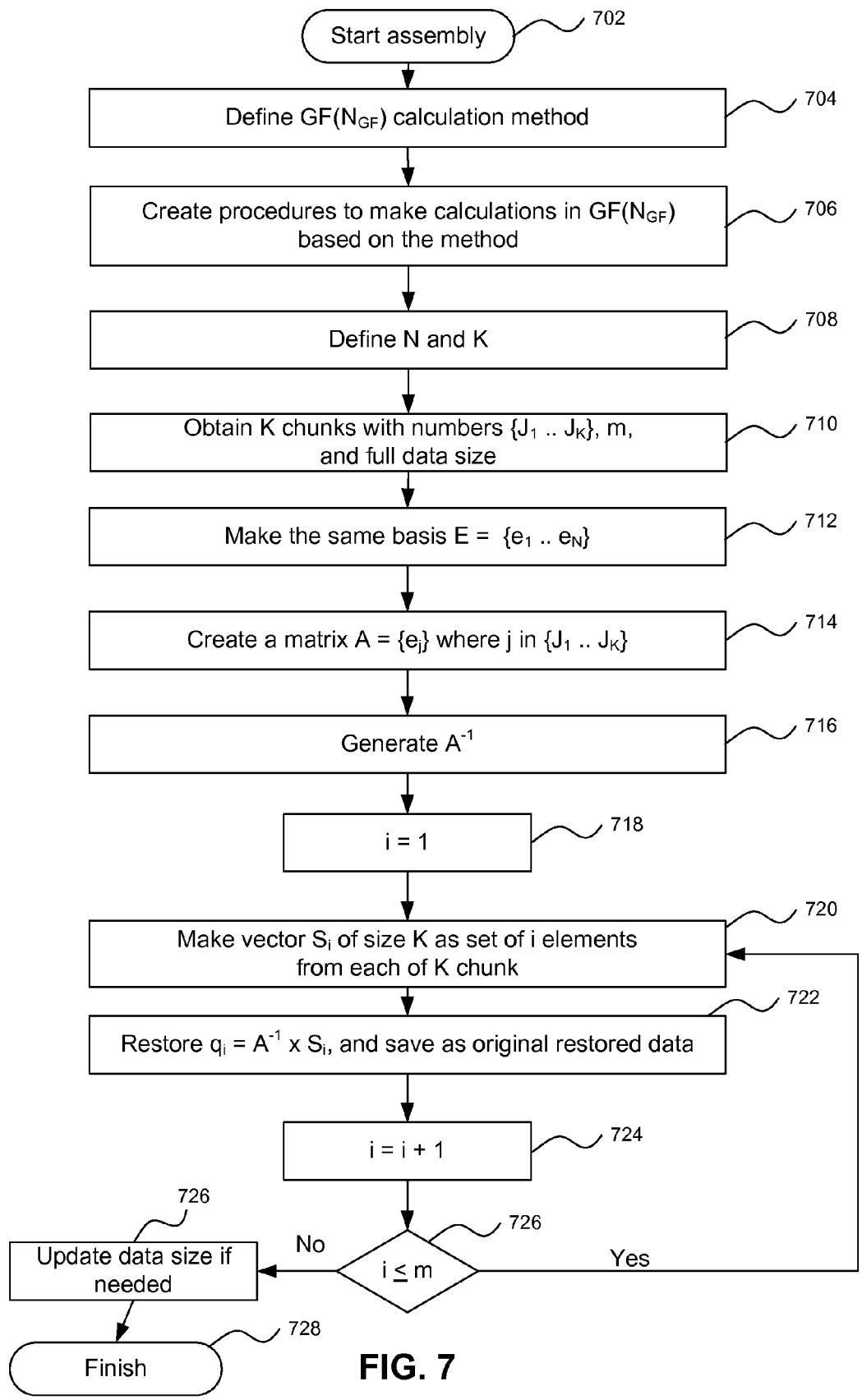
FIG. 7 illustrates the assembly process according to the alternative embodiment.

FIG. 6 illustrates the process of disassembling a data block into chunks. As shown in FIG. 6, after the start of the disk assembly process (step 602), a calculation method is defined. The calculation method can be based on the appropriate algorithm that provides a possibility of generation different chunks that represents the initial data in required level of correspondence. FIGS. 6 and 7 show an example of using the method based on a Galois field GF ($N_{GF}$). Also other calculation methods of generating appropriate chunks may be used. Such a method can be an algorithm based on Chinese reminder theorem, algorithms that use natural numbers as a calculation basis, or algorithms of matrix calculus.

In the exemplary embodiment, the method that is based on calculations in Galois field is chosen and defined in step 604. Next, in step 606, procedures are invoked to make calculations based on the GF ($N_{GF}$). K and N are defined for the particular data portion (note that for different data portions and different data volumes, different values of N and K can be used (step 608). A basis vector E is then created (step 610). m is defined, an original data is split up into a sequence of vectors Q (step 612).

Initially, j is defined as 1 (step 614), and $(q_i, e_j)$ for all i = 1 . . . m is generated (step 616). The $j^{th}$ data chunk is then formed from the vector $(q_i, e_j)$ (step 618). Next, j is incremented (step 620). As long as j is less than N (step 622), steps 716-720 are repeated. If j=N, the disassembly is finished (step 624).

FIG. 7 illustrates the exemplary embodiment of the assembly process according to the invention, wherein the reverse conversion is described in terms of Galois field. Taking into account that some data transformations can be implemented differently depending the particular calculation basis, different methods of reverse transformation may be used.

In the exemplary embodiment, as shown in FIG. 7, after the start of the assembly (step 702), the calculation method based on a Galois field of order $N_{GF}$ is defined (step 604). In step 710, K data chunks are obtained, such that the data portion can be reassembled from the data chunks. A basis E is created (step 712). A matrix A is generated (step 714). The inverse of the matrix A, $A^{-1}$, is then generated (step 716). i is set to one (step 718). A vector $S_i$ of a size K is created from each chunk (step 720). $q_i$ is restored as $A^{-1} \times S_i$, and is saved as the originally restored data (step 722). i is incremented (step 724). If i is less than or equal to m, steps 720, 722 and 724 are repeated. Otherwise, data size is updated, if needed (step 726). The assembly process then finishes (step 728).

Figure 8:
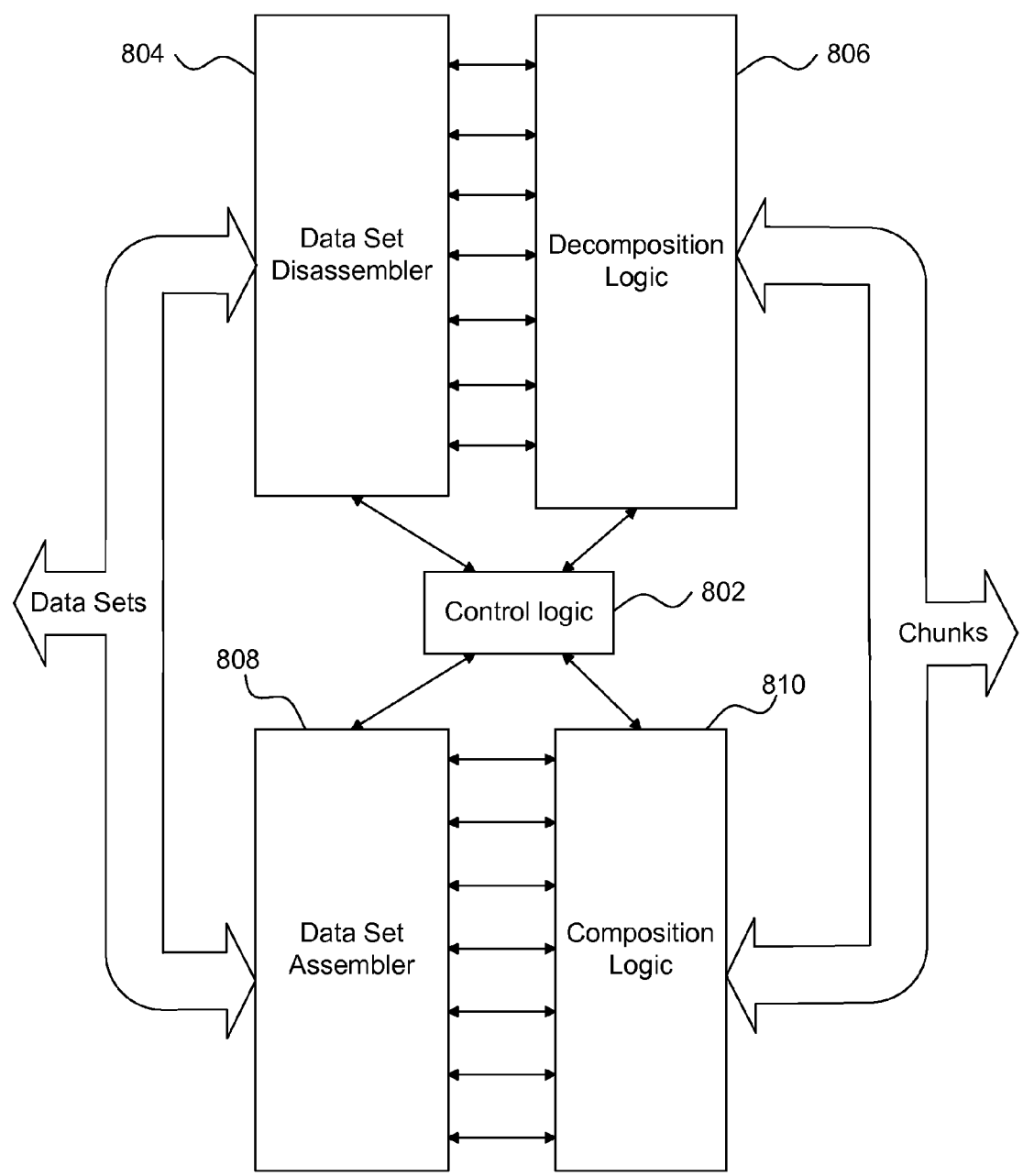
FIG. 8 illustrates an exemplary controller that can be used in the present invention.

FIG. 8 illustrates an exemplary system of managing distributed storage that utilizes a hardware controller, and which can be used to implement the present invention. Control logic 802 interfaces to a data portion builder 804 and decomposition logic 806. The controller also interfaces to the data assembler 808 and the composition logic 810. Host data is received from or sent to a source of data (e.g., host data storage or applications). Data chunks are sent out to or received from storage elements that store the data chunks. The data portion builder, as described above, breaks up the data set into data blocks. The decomposition logic 806 (that is adapted for the (N,K) algorithm) converts each data portion into the L data chunks. The data assembler 808 and the composition logic 810 restores data blocks and data sets from the chunks. The composition logic 810 converts the data chunks into blocks. The data assembler 808 converts the blocks into the original data set. The control logic 802 also (optionally) insures that data block size is appropriate (or adds filler as necessary). The control logic 802 can also decide on an optimized data chunk size, or the values of K and N (which are chosen based on fault tolerance requirements. In one example, the controller can have a RAM, ROM or EPROM, which stores the parameters L, N, K and the block length. It is preferable to use its own RAM area for storage of the value of L). The size of the data chunk can correspond to, for example, a network message transfer unit (MTU), which is a network parameter. For example, the most efficient MTU may be packet size (e.g., 512), or some multiple of packet size, etc. The control logic 802 can also be responsible for making sure that the desired tolerance level is achieved, by changing the values of N, L and K, as necessary, or for example, by storing more than one data chunk on a single storage element, if necessary.

The process of disassembly and assembly of the data volumes into data portions and data chunks is as described above. The chunks can be transmitted to the storage element using, for example, buses, (e.g., SCSI) or network transmission mechanism.

As described above, the controller can optionally request K data chunks, and, if some of the data chunks cannot be received, or contain errors, can request additional data chunks, or can ask for all the data chunks. This is also possible if the reliability of the interface to the storage elements is unknown, or if transmission speed is a factor, for example, if the data chunks are transmitted over the Internet using TCP/IP.

Although the invention may be implemented on a network of servers, the invention is not limited to that implementation. For example, the algorithm and the approach described above can also be used in a RAID structure. Conventional RAID structures typically include a number of hard drives that to the user appear as a single system. A controller is commonly used to divide up the data among the individual elements or sub-drives of a RAID. However, in a conventional RAID system, typically one of the storage elements is used to store parity data. Also, conventional RAIDs typically have a fixed maximum number of storage elements that can fail, before the entire RAID device becomes inoperative.

The approach described above provides an ability to dynamically change the number of storage elements of a RAID that are used to store data, depending on the fault tolerance requirements, and the number of actual storage elements of the RAID functioning at any given time. Note also that by eliminating the need to store parity data, the actual storage capacity of the RAID can be increased. Furthermore, the storage of data can take into account the fault tolerance requirements, such that data whose integrity is more critical can be stored with a greater degree of fault tolerance, compared to data that is less critical. Furthermore, it is possible that some elements of the RAID may experience temporary, or intermittent, failures. The present approach still allows effectively using the RAID structure, even if a greater than expected number of storage elements of the RAID fails, permanently or temporarily.

Additionally, the present invention may be used in a distributed storage system. For example, dedicated storage elements may be connected to a network, effectively forming a distributed storage system. The present invention allows taking advantage of a collection of network storage elements of essentially arbitrary number and complexity, so long as the storage elements connected to the network are accessible to the controller at some point in time. This has a number of applications for fault-tolerant networks. For example, some of the applications include "battlefield Internet" applications. A particular difficulty that exists with conventional distributed systems, particularly those that must operate in a hostile environment, is the requirement for user authentication and login. This is particularly critical in some military applications, where it is important to prevent hostile nodes from taking advantage of the network. The present application does not require such authentication by each device that wants to connect to the network to be used as storage.

For example, consider a number of devices, such as laptop computers or PDAs, used by personnel in the field. These devices may be connected to each other, and/or to a communications node, using any number of wireless protocols, for example, Wi-Fi, or BlueTooth, etc. In the case of files or large amounts of data that need to be stored, these devices can all form a dynamically configurable "storage network," and even if a hostile "device" attempted to connect to the network, that device would not be able to recover the contents of the entire file or data set, since it only has one chunk of the chunks of the data stored on it. Furthermore, as the devices carried by the personnel in the field come "in contact" with the network, and then lose contact with the network, the system is able to dynamically reconfigure itself, depending on the size of the files being stored and the number of storage elements connected to the network.

It will be appreciated that a number of protocols may be used to implement the fault tolerance storage approach described above. Some of the protocols are transport protocols, such as the TCP/IP protocol, which is used by the majority of devices connected to the Internet. Other protocols can include Wi-Fi protocols, BlueTooth, Ethernet protocols, etc.

Also, various physical layer device protocols may also be utilized to allow the controller to communicate with the individual "storage elements."

It will be appreciated that the algorithm described above is only one of the possible algorithms. Generally, the algorithms belong to a class of algorithms called (N,K) algorithms. Any algorithm can be used, so long as the solution satisfies the criteria that, with the data block divided into N data chunks, the block can be reassembled from K chunks.

Additionally, it will be appreciated that, unlike conventional storage systems, such as conventional RAIDs, there is no need for two modes of operation—a "normal" mode and an "error" mode. Conventional systems typically switch to an error mode when one of the storage elements fails. Although the present invention permits the use of an error mode, it is not necessary, since it is also possible to always have just one mode (a "normal" mode), which either succeeds in reassembling the data block, or fails. As yet another alternative, it is possible to combine the approach of the present invention with an error mode, such that some of the data in the data block being stored is additional parity data. In that case, if the number of storage elements is less than K, the error mode that uses the parity data from the functioning storage elements can then be used to recover the data.

Another example of where the invention can be applicable is the situation where the communications channel between the controller and one of the storage elements is unreliable. For example, this may be due to intermittent noise on the network, due to jamming, due to an occasionally malfunctioning network interface hardware, or due to any other number of causes. The approach described herein allows the storage network to dynamically adapt to the situation of storage elements coming online and going offline in a random manner.

As alternative implementations, it is also possible to have a hardware controller added to, for example, motherboards of personal computers and similar type systems. Alternatively, an actual server connected to a network can be used as a "controller," for purposes of disassembly and re-assembly of the data being stored.

Other examples of storage networks that can take advantage of the approach described above include networks of mobile computers, PDAs, smart phones, etc., including the case where the various storage elements are not the same type. For example, some of the elements that act as individual storage elements can be laptop computers, others can be smart phones, others can be PDAs, etc. Also, the transport protocols used for communication need not be the same among all the devices that are connected to form the distributed storage device described above.

As yet another alternative, the approach described above may be implemented as a dedicated controller on a chip, or as part of a dedicated chip, such as a disc controller, where the (N,K) algorithm is implemented in hardware, rather than in software.

The method and controller according to the present invention can be used in a mobile device that collects image data, such as video or pictures. Assuming the device is connected to a network, for example, using Wi-Fi connectivity, when the amount of data (representing the images being photographed, or video recorded) exceeds the storage capacity of the device, the device can utilize other devices connected to the network, using an (N,K) algorithm described herein.

As yet another alternative, instead of hard drives that form a defined static array, a controller can be connected to network adaptors, each of which, in effect, simulates an actual drive. Thus, the controller that implements the algorithm described above would forward the data chunks through the network adaptors to the appropriate storage devices that are connected to a network, such as a LAN, a WAN, or some other distributed network, such as the Internet.

Additionally, the individual storage elements that form part of a distributed storage system described herein can be added or removed on the fly, as described above. Furthermore, they can be added or removed not only as the elements themselves become available, but also as requirements for fault tolerance change. For example, if the system administrator decides that the data being stored on the distributed storage system requires a higher degree of fault tolerance than previously believed (for example, if mission-critical data is now being stored on a network that previously only stored less-critical information), then the fault tolerance parameters can be changed on-the-fly, in effect changing the N or K in the (N,K) algorithm, thereby effecting the on-the-fly change of fault tolerance of the storage system.

Each data block can be stored as a set of data chunks whose number "N" may vary over time. However, it is always possible to restore the entire data block completely from any "K" ($K \leq N$) data chunks of the stored data block. This enables redundancy. The size of each chunk of the stored data block is about 1/K of the size of the data block. The number "N" of data chunks contained in the data storage system may vary depending on the configuration of the arbitrary network of servers and on the number of servers in the network. While changing the number "n", the data stored in the existing chunks is not changed in any way.

The first step in the disclosed method is to define an appropriate number of data chunks $P_1, P_2, P_3 \ldots P_n$. A minimal number "K" of data chunks needed to completely assembly the block is defined usually from size requirements (for example, the size of one chunk that is close to optimal for transfer via Internet TCP/IP can be about 1K byte).

The next step in the disclosed method is to define a fault tolerance level. For example, in a distributed arbitrarily-connected network including some number "L" working servers, fault tolerance is determined by setting the number "M" (M<L) of the working servers that could be switched off (or fail by themselves or due to network inaccessibility) simultaneously at any moment in time. To reconstruct the original block, at least M+K data chunks of the original block must be created and stored on at least M+K separate servers in the network. In such a case, the ability to restore the original block, even in case of the simultaneous unavailability of M servers, is guaranteed. This is because if M servers become unavailable, the required minimum number of data chunks to reconstruct the data set will still be available (M+K)−M=K).

The disclosed method also could be used for a significant (up to "K" times) increase in data transfer rate because the chunks can be transferred in parallel from "K" or more servers, independently of each other. Under some conditions, this method could give the optimal utilization of network bandwidth and speed up overall data transfer time.

Another application of the present invention relates to increasing reliability of storage on a physical medium. When using the present invention, all the data chunks can be written to the storage elements (i.e., physical storage elements) that are placed on a single storage medium. Such a medium may be, for example, a computer's random access memory (RAM), a hard disk drive, optical storage devices of any type, e.g., a CD, a DVD, Blu-ray disks, HD-DVD or a magneto-optical disks. Other storage media, such a ZIP drives, floppy drives, flash drive or similar devices can also be used. In this case, when distributing the data chunks, it is possible to increase reliability of the storage. To achieve this, the storage elements are allocated throughout the storage medium in a manner that minimizes the possibility of simultaneous damage of two or more storage elements that store data related to different chunks of a single data block.

As discussed below such an allocation of storage elements can be performed both by data processing (while distributing data chunks to the storage media), and before start of distributing data chunks by an appropriate data stream preparation, such that the data stream takes into account the data flow while writing data to the storage media, e.g., with sequential write access only. In one embodiment, all the data chunks for different blocks are generated and stored in an intermediate (buffer) storage before beginning to write the chunks to the storage media. Then, data chunks transferred to the storage media for the write in such a way that data chunks corresponding to a single block are written to storage elements that are separated by some physical distance. In another embodiment, data chunks corresponding to the storage element currently being written into are generated synchronously with writing data to the storage media.

In one particular case, during the data write, it is possible to use logical addresses (for hard disk drives or other devices with random access), such that the logical addresses represent storage elements of the storage medium that are physically separated from each other. When using a hard disk drive with multiple storage surfaces (whether one-sided or two-sided), the different chunks should preferably be written to the storage elements located on different surfaces of such a hard disk drive. When using a storage medium with a single working surface, for example, a CD ROM, a DVD, a magnetic strip on a card, or a single-surfaced hard disk drive, it is preferable to organize the distribution of the data chunks such that the storage elements corresponding to different chunks of the same data block are as far away from each other as physically possible. Also, it is preferable to define geometrical areas of the data storage medium (physical carrier medium) intended for placing storage elements corresponding to different chunks of one block, and implement writing the chunks to storage elements located within the limits of the specified areas. Such areas can be, e.g., sectors, circular areas of a disk, or sections of tape.

In one embodiment, the size of the data chunks may be chosen such that the size corresponds to storage elements located within a physical partition or sub-unit of the storage medium, e.g., an angular domain or a track.

Due to the fact that most optical storage media are devices with sequential write access, in order to achieve the advantage in reliability using the present invention, the data stream should be correspondingly optimized. For example, it is possible to write data to such optical media only after the data chunks correspond to different data blocks have been generated. These data chunks can be interleaved during the write operation, such that the storage elements are evenly allocated throughout a large portion of the storage medium.

In another embodiment, the storage elements corresponding to a common block can be placed on different tracks of the same hard disk drive, or on portions of the tracks that are angularly separated from each other. Also, adjacent tracks of the same hard disk drive or optical storage medium can hold storage elements that correspond to different blocks. Also, it is possible to combine the track-based approach discussed above with the disk sector approach, which reduces the possibility of losing data when the read/write head of the hard disk drive hits the surface of the hard disk drive, or due to mechanical damage to any optical recording surface of a CD ROM or DVD. Also, the present invention allows reducing the possibility of failure to recover data due to scratches on the surface of the storage medium.

Also, it is preferable to define the size of the data chunks such that they correspond to the size of the storage elements represented by storage units or subunits that the physical storage medium is divided into, such as sectors, tracks, etc.

When the present invention is used for storage of data on magnetic strips (e.g., credit cards, airline tickets with a magnetic strip, etc.), it is preferable to optimize allocation of storage elements such that physical distance between storage elements corresponding to the same block is maximized. To this can be accomplished, for example, through interleaving of the data chunks that belong to different blocks. This increases the possibility of recovery of data due to damage to the magnetic strip, scratches, folding of the credit card or ticket with the magnetic strip, demagnetization, or damage due to operation of the card reader.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for data storage in a distributed data storage system with redundancy, the method comprising:
dividing a data set into a plurality of data blocks;
defining a size of data block and adding filler to any data block that is less than the defined size;
defining a minimal number K out of N data chunks needed to restore one data block;
disassembling each of the data blocks into at least L different data chunks, wherein $K \leq L \leq N$; and
distributing the at least L data chunks to storage elements of the distributed storage system.

2. The method of claim 1, wherein a size of each data chunk is defined based on a size of Message Transfer Units in a TCP transmission protocol.

3. The method of claim 1, wherein $L \geq M+K$, M being a number of simultaneously failed storage elements.

4. The method of claim 3, wherein the data chunks corresponding to one data block are distributed to at least M+K different storage elements.

5. The method of claim 1, wherein all the data chunks are written to the storage elements placed on a single storage medium.

6. The method of claim 5, wherein the single storage medium is one of a hard disk drive or a CD or a DVD or a magneto-optical disk or magnetic tape or magnetic stripe.

7. The method of claim 5, wherein the storage elements are allocated throughout the storage medium so as maximize distribution of data related to different chunks of a single data block.

8. The method of claim 7, wherein the storage elements are allocated separately by distance.

9. The method of claim 8, further comprising:
defining geometrical areas of the data storage medium for placing storage elements corresponding to different chunks of one block; and
writing the chunks to storage elements located within the geometrical areas.

10. The method of claim 9, wherein the geometrical areas are any of: a set of parts of sectors, a set of circular areas of a disk, a set of sections of tape, and a set of sections of a magnetic stripe.

11. A method for data storage in a distributed data storage system with redundancy, the method comprising:

dividing a data set into a plurality of data blocks;

defining a size of data block and adding filler to the data set so that the data set is represented by an integral number of data blocks defining a size of data block and adding filler to any data block that is less than the defined size;

defining a minimal number K out of N data chunks needed to restore one data block;

disassembling each of the data blocks into at least L different data chunks, wherein $K \leq L \leq N$; and distributing the at least L data chunks to storage elements of the distributed storage system.

12. A method for retrieving data in a distributed data storage system comprising:

receiving, from a distributed storage system, any K data chunks out of L data chunks for each data block, wherein $K \leq L$;

composing the received data chunks into corresponding data blocks;

assembling the data blocks into a data set; and removing added data from the data set, the added data resulting from chunk generation.

13. The method of claim 12, wherein data chunks corresponding to the same data block were distributed to a plurality of storage elements of the distributed storage system.

14. The method of claim 12, wherein the storage elements are physical storage blocks.

15. A system for managing distributed storage comprising:

decomposition logic that disassembles each data block into L different data chunks, such that K data chunks out of N data chunks are sufficient to restore the original data blocks, wherein $L \leq N$;

an interface for distributing data to storage elements;

composition logic for assembling K data chunks received for each data block into corresponding data blocks; and control logic to control operations of the decomposition logic and the composition logic.

16. The system of claim 15, further comprising:

a data set disassembler that divides the data set into data blocks; and a data set assembler that combines the data blocks into the data set, wherein the control logic controls operations of the data set disassembler and the data set assembler.

17. The system of claim 15, wherein the storage elements include servers.

18. The system of claim 15, wherein the storage elements include a Storage Area Network.

19. The system of claim 15, wherein the number L depends on any of a desired fault tolerance level, a network bandwidth, available system resources and workload.

20. A system for managing distributed storage comprising:

decomposition logic that disassembles each data block into L different data chunks, such that K data chunks out of N data chunks are sufficient to restore the original data blocks, wherein $L \leq N$;

an interface for distributing data to storage elements;

composition logic for assembling K data chunks received for each data block into corresponding data blocks; and control logic to control operations of the decomposition logic and the composition logic, wherein any of N, L, and K vary for different data blocks.

* * * * *